(12) United States Patent
Thivierge et al.

(10) Patent No.: US 9,352,434 B2
(45) Date of Patent: May 31, 2016

(54) FIXTURE BLOCK

(71) Applicant: A.V. Gauge & Fixture Inc., Oldcastle (CA)

(72) Inventors: Casey J. Thivierge, Belle River (CA); Cory V. Daudlin, Belle River (CA); Timothy M. Campeau, Belle River (CA); Denis G. Levasseur, Ruscom (CA)

(73) Assignee: A.V. Gauge & Fixture Inc., Oldcastle, Ontario (CA)

( * ) Notice: Subject to any disclaimer, the term of this patent is extended or adjusted under 35 U.S.C. 154(b) by 212 days.

(21) Appl. No.: 14/148,892

(22) Filed: Jan. 7, 2014

(65) Prior Publication Data

US 2014/0191458 A1   Jul. 10, 2014

Related U.S. Application Data

(60) Provisional application No. 61/749,771, filed on Jan. 7, 2013.

(51) Int. Cl.
*B23Q 3/18*   (2006.01)
*B23Q 16/00*  (2006.01)

(52) U.S. Cl.
CPC .............. *B23Q 3/18* (2013.01); *B23Q 16/001* (2013.01)

(58) Field of Classification Search
CPC ........ B23Q 16/001; B23Q 17/20; B23Q 3/18; B25B 5/04; E05C 17/22
See application file for complete search history.

(56) References Cited

U.S. PATENT DOCUMENTS

| | | | | |
|---|---|---|---|---|
| 372,326 | A * | 11/1887 | Palmenberg | E05C 17/166 24/69 R |
| 1,154,862 | A * | 9/1915 | Hoagland | E05C 17/22 292/262 |
| 4,062,578 | A * | 12/1977 | Chen | E05C 17/166 292/262 |
| 4,451,026 | A * | 5/1984 | Coope | B23Q 11/0875 269/24 |
| 4,958,813 | A * | 9/1990 | Dykstra | B25B 5/061 269/234 |
| 5,572,144 | A * | 11/1996 | Davidson | G01R 1/07314 324/750.19 |
| 6,371,467 | B1 * | 4/2002 | Nishimoto | B25B 5/064 269/32 |
| 7,806,393 | B2 * | 10/2010 | Hara | B25B 5/087 269/228 |

* cited by examiner

*Primary Examiner* — Lee D Wilson
*Assistant Examiner* — Tyrone V Hall, Jr.
(74) *Attorney, Agent, or Firm* — Brinks Gilson & Lione

(57) ABSTRACT

The present disclosure relates generally to fixturing devices and more specifically to a pivoting fixture device configured to locate and lock a check feature in a precise location.

18 Claims, 9 Drawing Sheets

FIXTURE BLOCK

CROSS REFERENCE TO RELATED APPLICATIONS

This application claims the benefit of U.S. Provisional Patent Application No. 61/749,771 filed Jan. 7, 2013, the content of which is hereby incorporated by reference in its entirety.

FIELD OF THE INVENTION

The present disclosure relates generally to fixturing devices and more specifically to a pivoting fixture device configured to locate and lock a check feature in a precise location.

BACKGROUND

Check fixtures are implemented primarily in manufacturing operations to test for variations in processes. In some check fixtures it is desirable to rotate parts into a location about a fixed axis. Though hinges and other similar devices may be adapted to be applied in fixturing operations, they lack accuracy and are not designed for fixturing heavy test features in harsh environments. Another issue related to fixtures is ensuring that they are configured such that features attached to actuating portions can reach locating positions without unnecessary travel. The disclosure relates to a pivoting fixture unit and comprises a low-profile, modular design, with increased strength and improved performance.

DETAILED DESCRIPTION

Figure 1:
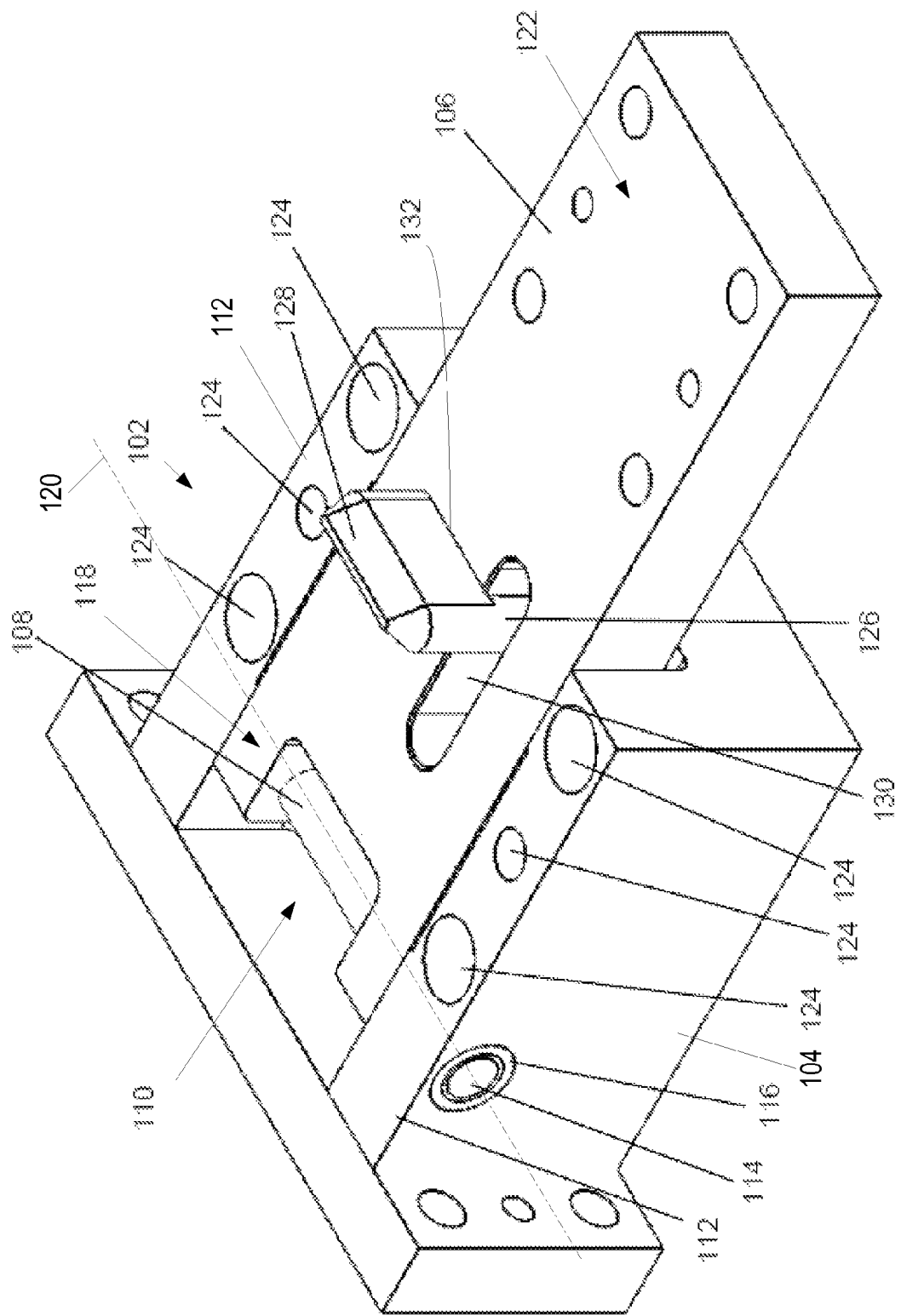
FIG. 1 is pictorial view of a pivoting fixture device shown in a locating position in accordance with the disclosure.

Referring to FIG. 1, a pivoting fixture device 102 is illustrated in a locating position in accordance with the teachings of the disclosure. The fixturing device 102 generally comprises a base 104 coupled to a platform 106 by a pivot pin 108. The base 104 may further include a channel portion 110 being disposed between two side walls 112 configured to receive the platform 106 between the sidewalls 112. The pivot pin 108 may be received at two opposing end portions 114 by a reinforced bushing 116 disposed in each sidewall 112, and extends through a proximal end portion 118 of the platform 106. In this configuration, the platform 106 is constrained by the pivot pin 108, but may rotate freely about a longitudinal axis 120 of the pivot pin 108.

The platform 106 may extend to a distal end portion 122 beyond the channel portion 110. In order to mount the base 104, a plurality of mounting apertures 124 being configured to receive mechanical fasteners, preferably a plurality of machine screws and dowel pins, may also be disposed in the base 104. In order to ensure accuracy and allow for precision applications of the pivoting fixture device 102, the base 104 and the platform 106 may be composed of any rigid material, and preferably are composed of hot rolled steel or other, similarly hard, resilient materials. Applying high strength steel grades (e.g. hot-rolled, cold-rolled, tool-steel) may be an important aspect of the design depending on the application. High strength steel may be used for any applications disclosed herein to improve the dimensional accuracy of the pivoting fixture device 102, but may further improve the device 102 by providing for a smaller footprint that may be advantageous to mounting to check features with limited space for attachment.

In this implementation, a shaft 126 is attached to the base 104 and disposed in a stop key 128. In the locating position shown, the shaft 126 may extend through a locking aperture 130 in the platform 106. The stop key 128 is shown in a locked position, wherein a tapered surface 132 of the stop key 128 may be configured to abut the platform 106 and constrain the rotational motion of the platform 106 about the pivot pin 108. The stop key 128 may be configured to rotate relative to the base 104 in order to lock and unlock the platform 106. When rotated counterclockwise from the location shown, the tapered surface 132 may slide along the platform 106 with decreasing force and may release or unlock the platform 106 once the tapered surface 132 is aligned with the locking aperture 130.

Figure 2:
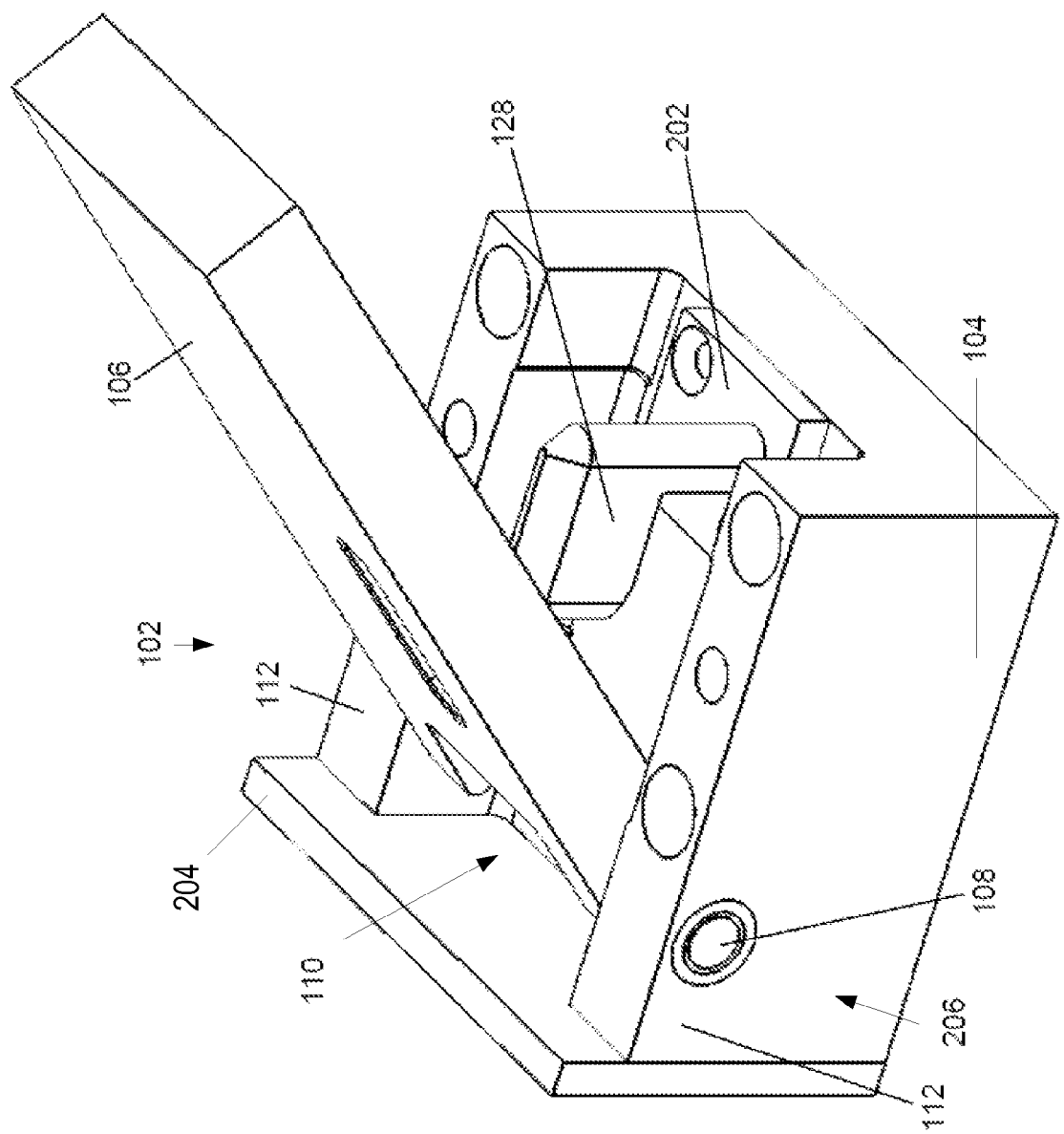
FIG. 2 is pictorial view of a pivoting fixture device shown in an unlocked or open position in accordance with the disclosure.

Referring now to FIG. 2, the pivoting fixture device 102 is illustrated in a unlocked or open position in accordance with the teachings of the disclosure. With the stop key 128 rotated into an unlocked position, the platform 106 is free to rotate about the pivot pin 108. With the platform 106 raised, a net pad 202 is visible and may be attached to the base 104 in the channel portion 110 to provide a precise and adjustable locking surface for the platform 106 to abut when positioned in the locked position shown in FIG. 1. This implementation may further provide for a back plate 204 attached to the base 104 at a proximal end portion 206 of the sidewalls 112. When fully opened, the platform 106 may contact the back plate 204 such that the platform 106 rests against the back plate 204 in a fully open position. The characteristics demonstrated by the several implementations of the disclosure teach of a pivoting fixture device 102 providing improved ergonomics and efficient operation, while improving locating accuracy.

Figure 3:
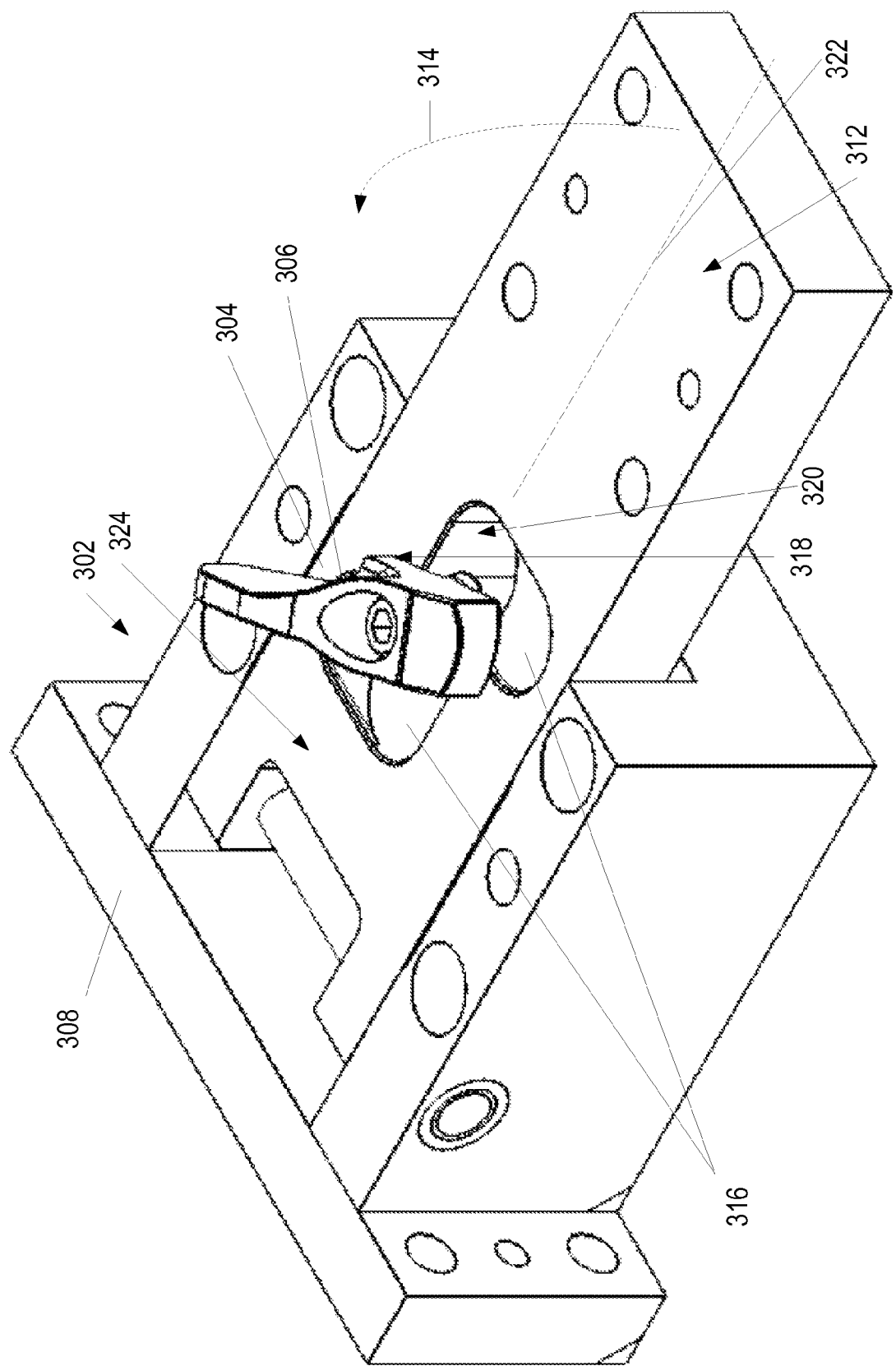
FIG. 3 is another implementation of a pivoting fixture device shown in a locating position in accordance with the disclosure.

Referring now to FIG. 3 another implementation of a pivoting fixture device 302 is illustrated in a locating position in accordance with the teachings of the disclosure. In this implementation, a platform 304 and a stop key 306 are introduced as well as the back plate 204 of FIG. 2 being replaced by a mounting plate 308. The modular design of the pivoting fixture device 302 may provide for the mounting plate 308 to be interchangeably implemented with other plates providing for increased flexibility in mounting the fixture device 302. A plurality of check feature apertures 310 may be disposed proximate to a distal end portion 312 of the platform 304 to locate and support a check feature (not shown). With a check feature attached to the platform 304, the motion of the check feature may also be restricted to rotate along an arc 314 created by the rotation of the platform 304 relative to the base 104 about the pivot pin 108.

The platform 304 of the instant implementation may incorporate recessed steps 316 configured to engage negative flats 318 in the stop key 306. The recessed steps 316 and negative flats 318 may provide for the stop key 306 to smoothly rotate into the locking position only in the clockwise direction and only unlock by rotation in the counterclockwise direction. A locking aperture 320 of the instant implementation is preferably disposed proximate to a longitudinal axis 322 of the platform and provides for the stop key 306 to apply evenly distributed pressure proximate to the longitudinal axis 322 of the platform 304. The recessed steps 316 disposed in the top surface of the platform 304 may provide for a lead-in for the stop key 306 when turning the stop key 306 into the locked position. The recessed steps 316 may also be configured to abut the negative flats 318 of the stop key 306 when positioned in a locked position after a 90 degree clockwise rotation.

The stop key 306 may further be configured to contact the platform across a central portion 324 comprising a contact span of approximately ⅓ of the platform 304 surface width. The contact span of the stop key 306 may prevent rotational deflection about the longitudinal axis 322 in cases of heavy loading. The deflection and positioning referred to in this disclosure may be of significant concern in fixturing applications. The disclosure may provide for implementations of fixturing devices having improved modular design configurations for mounting check features while also improving precision and accuracy in locating check features.

Figure 4:
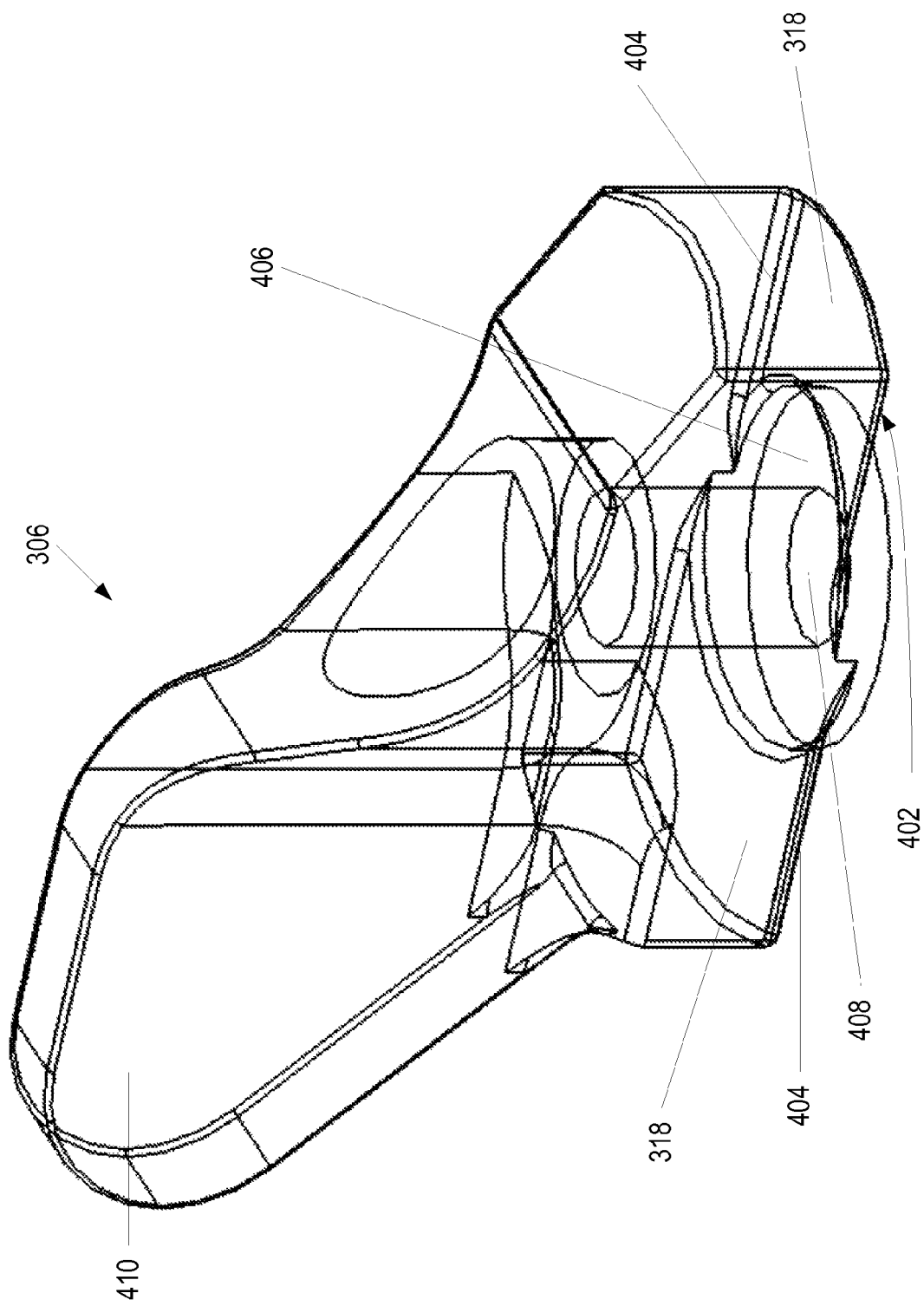
FIG. 4 is a partially transparent pictorial view of an implementation of the stop key in accordance with the disclosure.

Referring now to FIGS. 3 and 4, a partially transparent pictorial view of an implementation of the stop key 306 is illustrated in accordance with the teachings of the disclosure. The negative flats 318 of the stop key 306 each may further comprise an angled lead-in portion 402 on a bottom portion of the stop key 306. The lead-in portions 402 may provide for consistent pressure across the central portion 324 being evenly applied about the locking aperture 320. The negative flats 318 may further define rotational stops 404 configured to interact with the recessed steps 316 of the platform 304 as hard stops upon a stop key 306 rotation of 90 degrees into the locked position.

In this implementation, a spring washer cavity 406 may further be disposed around an aperture 408 extending through the stop key 306, the spring washer cavity 406 being configured to receive and locate a spring washer (not shown). The spring washer cavity 406 may prevent binding and provide a surface that may be ground or otherwise manipulated for fine pressure adjustments to the stop key 306 abutting the platform 304. The stop key 306 is ergonomically designed having improved leverage at a handle portion 410 to rotate the stop key 306. The stop key 306 may also be configured to fit the average hand of an adult operator (thumb and index finger). The height of the stop key 306 combined with the improved leverage of the handle portion 410 provide for one-handed operation of the pivoting fixture device 302 without requiring the use of tools.

Figure 5:
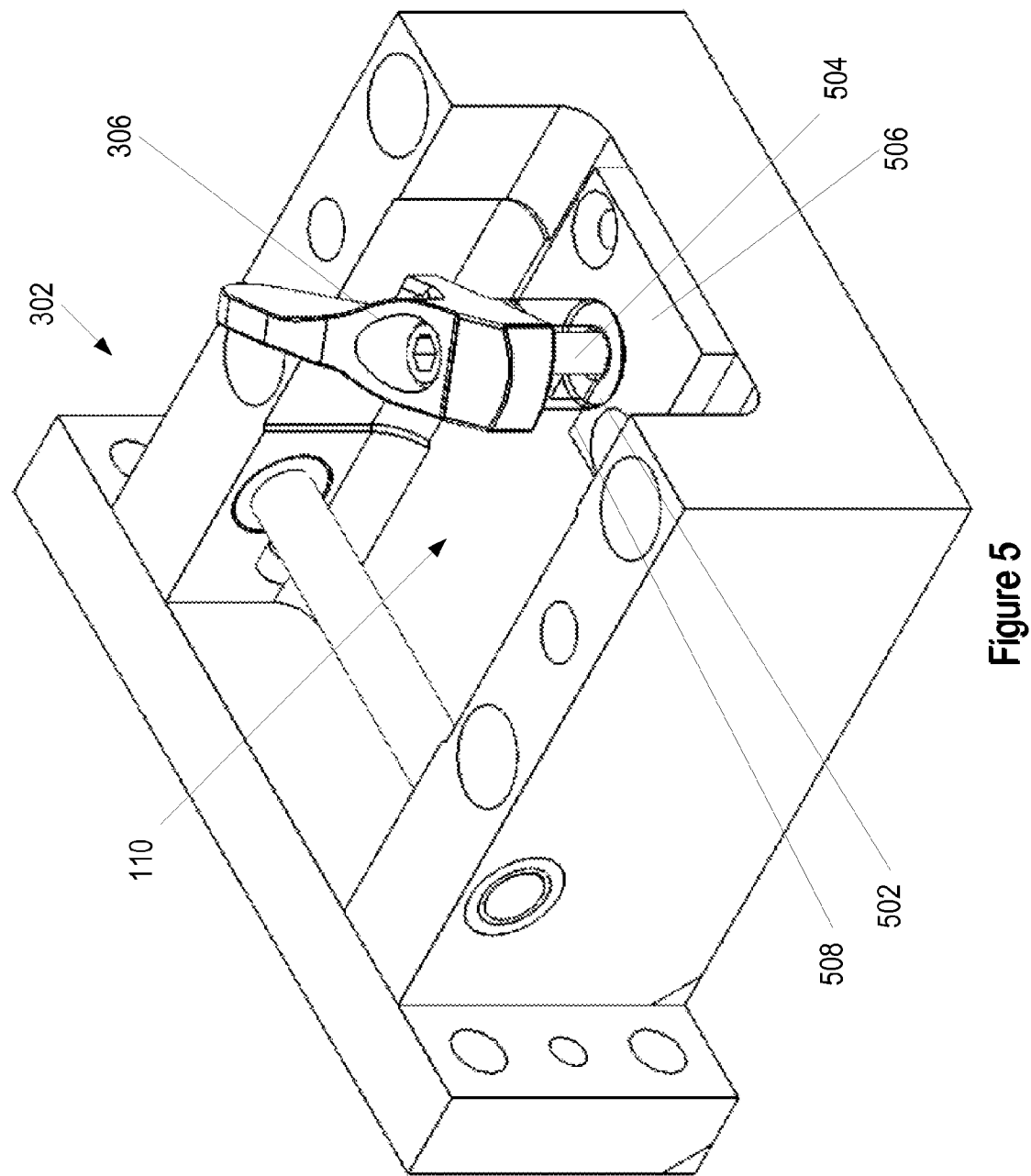
FIG. 5 is a partially transparent view of the pivoting fixture device in accordance with the teachings of the disclosure.

Referring now to FIG. 5, a partially transparent view of the pivoting fixture device 302 is illustrated in accordance with the teachings of the disclosure. In this implementation, the platform 304 is hidden to show a bushing 502 disposed around a shaft portion 504 of a fastener 506 extending through the stop key 306. The fastener may preferably comprise a socket head cap screw, but may also comprise any form capable of retaining the stop key 306 while allowing rotation. The shaft portion 504 retains the stop key 306 and extends into the bottom of the channel portion 110. A net pad 506 may also be attached to the bottom of the channel 110. In this implementation the net pad may further comprise a slot 508 providing for removal of the net pad 506 without removing the stop key 306. The slot 508 in the net pad may allow for adjustments to the thickness of the net pad 506 while the platform is in a locating position allowing for convenient fine adjustments.

Figure 6:
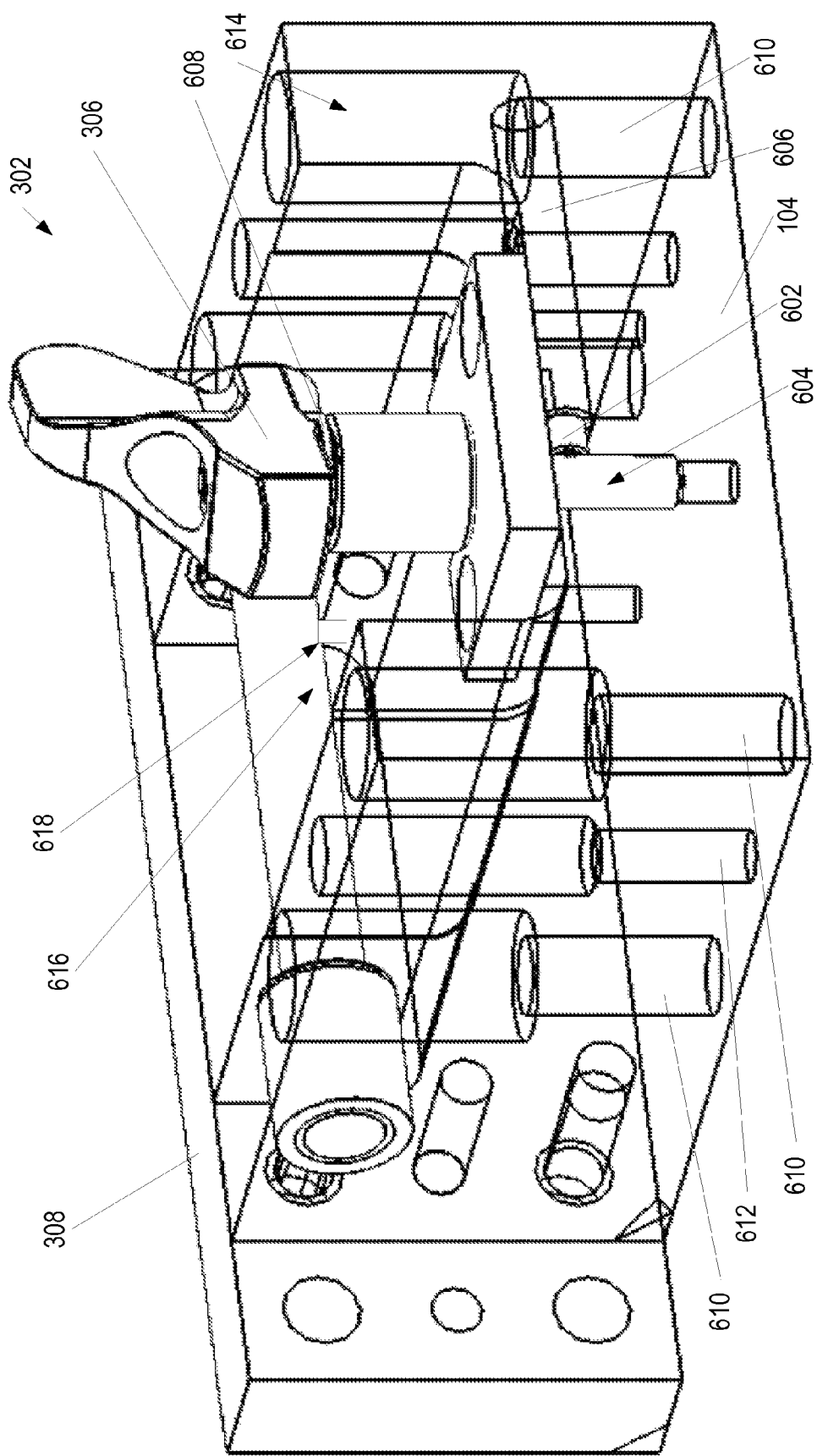
FIG. 6 is a projected partially transparent view of the pivoting fixture device in accordance the disclosure.

Referring now to FIG. 6, a projected partially transparent view of an implementation of a pivoting fixture device 302 is illustrated in accordance with the teachings of the disclosure. A set-screw 602 may be used to engage and lock a distal end portion 604 of the shaft portion 504 being accessible through an access passage 606. To allow for variable pressure to be applied to the platform 304 by the stop key 306, a spring washer 608 is also disposed around the shaft portion 504 between the stop key 306 and the bushing 502. The set screw 602 and the spring washer 608 may provide for the stop key 306 to apply a desired pressure to the platform 304 with very little variation. FIG. 6 further demonstrates the plurality of mounting apertures comprising fastener holes 610 and dowel pin holes 612 each having a counterbore portion 614 to ensure that a plurality of fasteners (not shown) do not protrude from the base 104. This implementation also may include the pivot pin 108 comprising a split pinned assembly 616 wherein a set screw 618 may be disposed in the platform 304 and engage the pivot pin 108. With the pivot pin 108 attached to the platform 304, the platform may rotate, and the set screw may prevent the pivot pin 108 from translating along the longitudinal axis 120.

A benefit of split-pinned construction and the centrally located stop key 306 is that they provide for a low profile design configured for simple and consistent, one-handed operation. Many fixturing applications requiring pivoting capability also are difficult to locate and orient in relation to the part being fixture. The low profile design of this and other related implementations of the disclosure provide for a pivoting fixture having the flexibility and precision to be applied in a variety of applications. Another benefit may include the mounting holes being accessible in all pivoting positions. This improvement may also be important because it allows the location of the pivoting device to be adjusted without moving the platform or an attached check feature.

Figure 7:
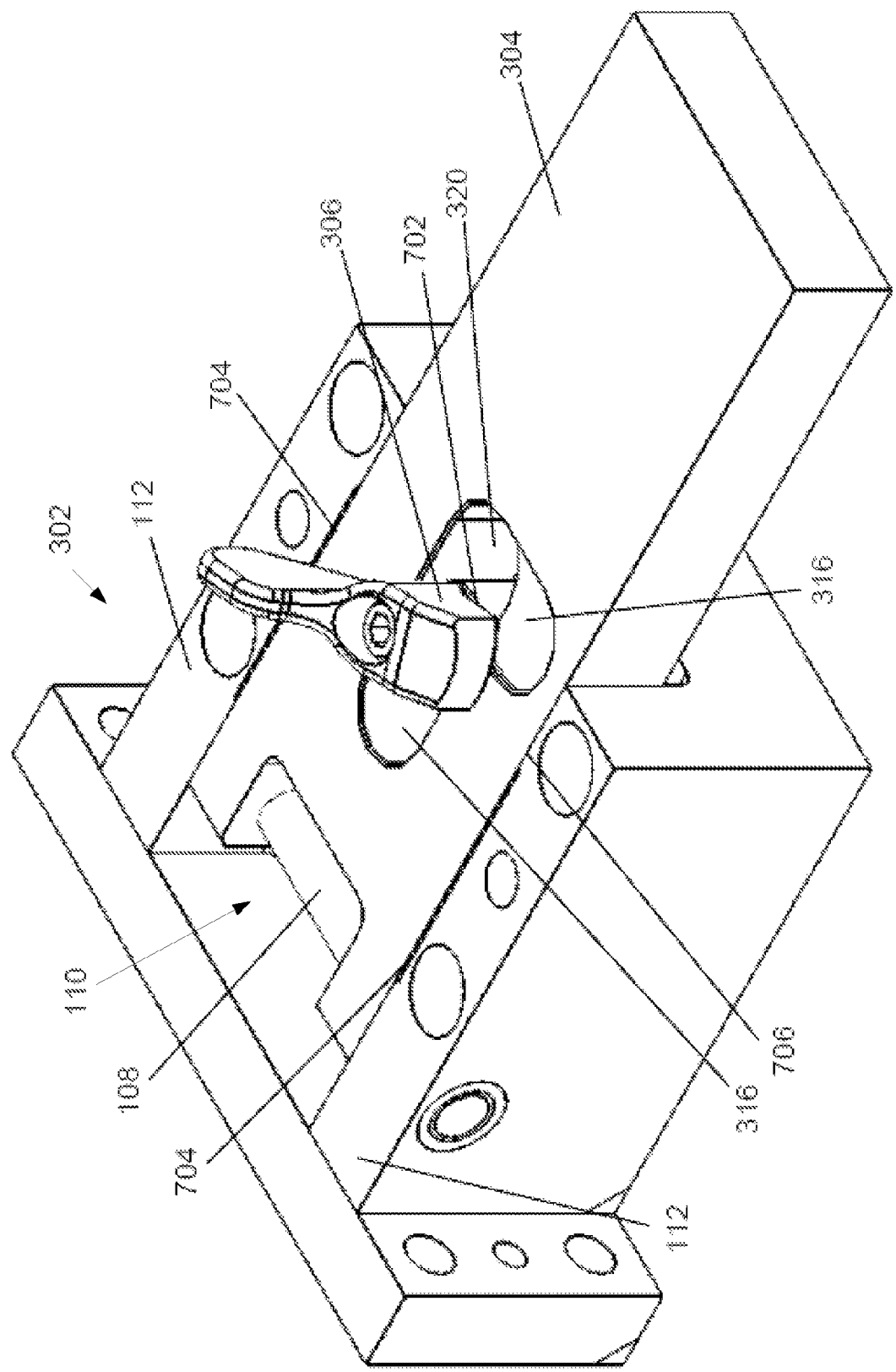
FIG. 7 is a detailed, projected view of an implementation of the pivoting fixture device in accordance with the disclosure.

Referring now to FIG. 7, a detailed projected view of an implementation of a pivoting fixture device 302 is illustrated in accordance with the teachings of the disclosure. FIG. 7 further demonstrates the interaction of the stop key 306 with the recessed steps 316 disposed in the platform 304. In this view, the locking aperture 320 is also demonstrated being significantly similar to a bottom profile 702 of the stop key 306. These profiles provide for the stop key 702 to pass through the platform 304 allowing the platform to rotate about the pivot pin 108 when the stop key 306 is in the un-locked position.

A recessed gap 704 may also be disposed in each sidewall 112 of the base 104 and improve locating accuracy of the platform 304 by locating against a reduced contact surface 706. Instead of locating the platform along the entire length of the sidewalls 112, the platform 304 is located against at least one reduced contact surface 706. By contacting a smaller surface of the sidewall 112, the locating variation of the platform 304 may be reduced due to the implementation of a smaller contact surface 706 with increased precision. The recessed gaps 704 also allow dirt to escape and collect in the recessed gaps 704 instead of building up and binding along the platform 304 in the channel portion 110. Recessed gaps providing the similar benefits may also be disposed in the sides of the platform (not shown). The recessed gap disposed in the side of the platform may extend along the sides from a top surface to a bottom surface and provide for similar smaller contact surfaces disposed at proximal and distal end portions of the platform.

Figure 8:
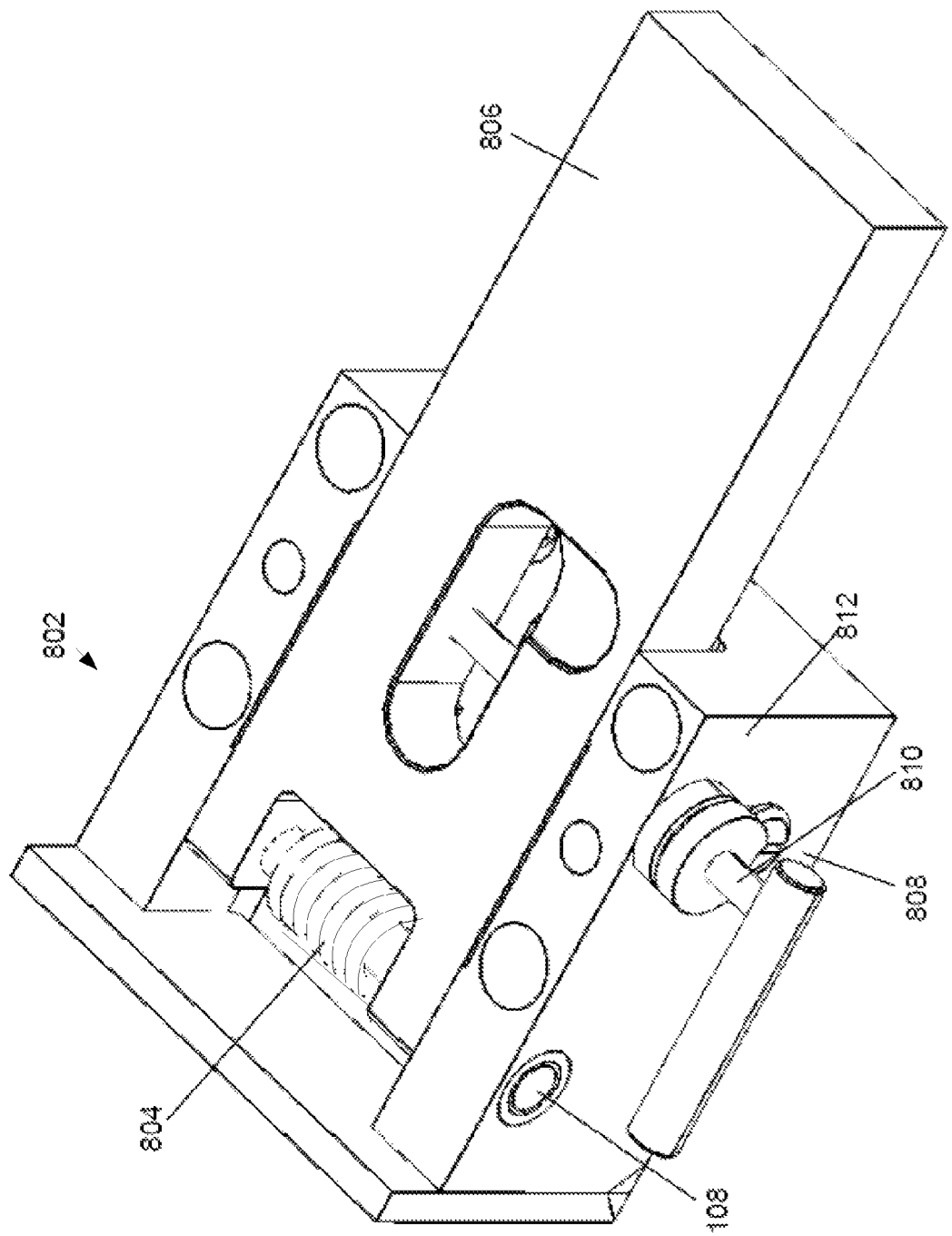
FIG. 8 is a pictorial view of another implementation of a pivoting fixture device in accordance with the disclosure.

Referring now to FIG. 8, a pictorial view of another implementation of a pivoting fixture device 802 is illustrated in accordance with the teachings of the disclosure. A safety spring 804 may be incorporated into this and other implementations previously introduced. The safety spring 804 may be disposed around the pivot pin 108 and engage the platform 806 and the base 808 to control the rotation of the platform 806 due to heavy check features. This implementation may further comprise a locking pin 810 option to locate the platform 806 in relation to the base 808. The locking pin 810 may be disposed in an aperture 810 in a sidewall 812 and extend into a cavity disposed in a side portion (not shown) of the platform 806. The locking pin 810 may provide similar locating benefits to the stop key 128 including consistent locating of the platform 806.

Figure 9:
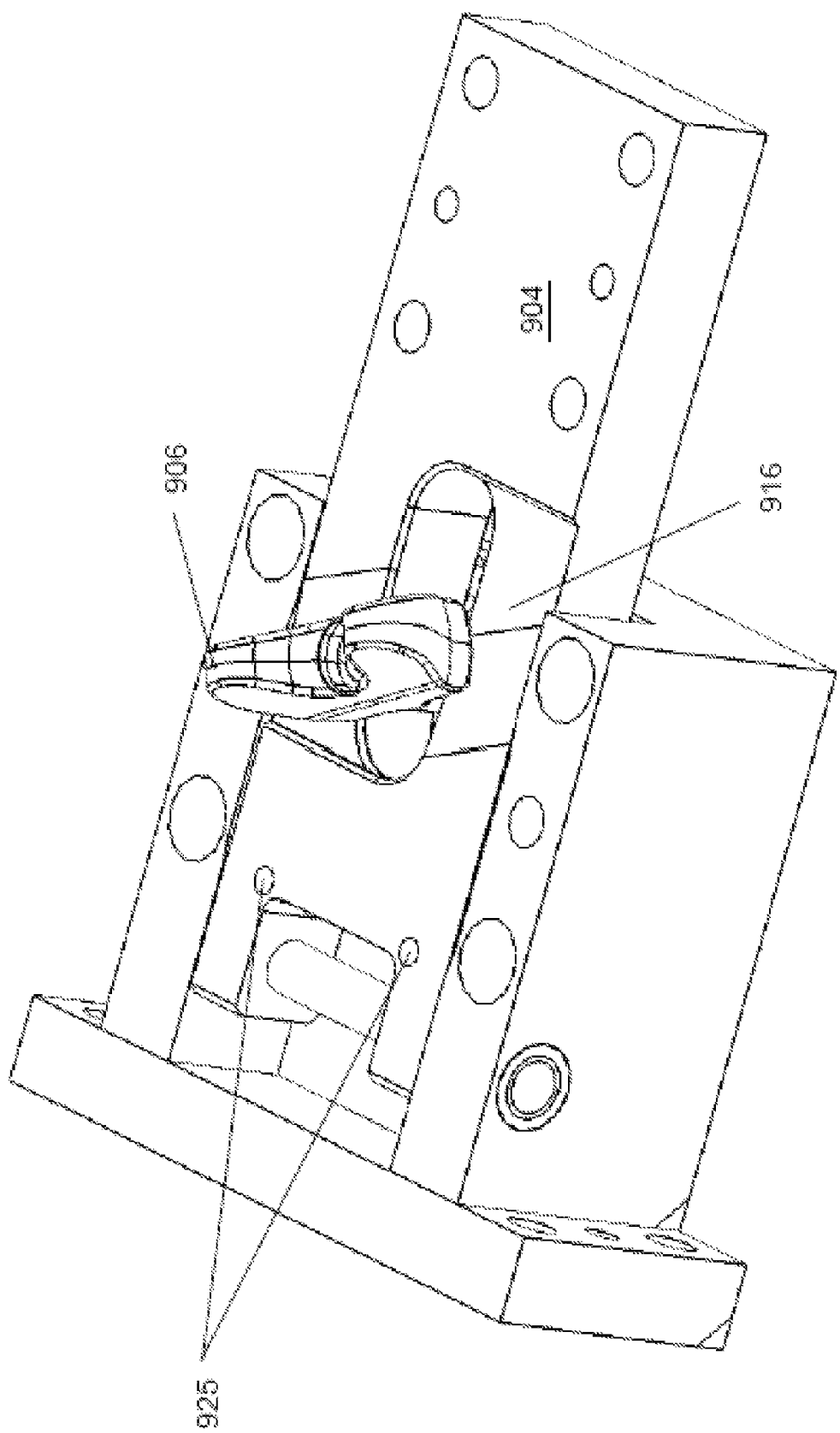
FIG. 9 is a pictorial view of another implementation of a fixture device with certain additional features.

In FIG. 9, an illustration of another implementation of a fixture device with certain additional features is provided. The stop key 906 is mirrored upon itself so that it works equally on both sides of the center of the shaft creating equal pressure when locked (to avoid any side-to-side flex or deflection). The symmetric design of the stop key 906 also provides a much more ergonomic and user-friendly experience for the operator. The shape of the recessed steps 916, disposed in the top surface of the platform 904, may provide for a lead-in for the stop key 906 when turning the stop key 906 into the locked position. The shape of the recessed steps 916 coincides with the symmetric design of the stop key 906. Hole features 925 allow for variations of a stop plate to be attached that limits the opening angle of the platform 904 when desired.

As a person skilled in the art will readily appreciate, the above description is meant as an illustration of the principles of this disclosure. This description is not intended to limit the scope or application of this disclosure in that the disclosure is susceptible to modification, variation and change, without departing from spirit of this disclosure, as defined in the following claims.

What is claimed is:

1. A pivoting fixture unit comprising:
a modular base having a channel portion disposed between two sidewalls;
a platform being disposed between the two sidewalls and coupled to the base by a pivot pin;
a surface attached to a base portion of the channel; and
a stop key configured to rotationally secure the platform in a locating position, wherein the stop key applies consistent pressure to the platform in the locating position of the platform, wherein the stop key engages the base and extends through a locking aperture in the platform, the stop key comprises a spring washer disposed proximal to a shaft portion.

2. The pivoting fixture unit of claim 1, further comprising a plate attached to the modular base and abutting each sidewall.

3. The pivoting fixture unit of claim 2, wherein the plate comprises a mounting plate.

4. The pivoting fixture unit of claim 1, wherein the platform extends along the channel portion and forms a recessed gap on each side extending between a plurality of contact surfaces between the sidewalls and the platform.

5. A pivoting fixture unit comprising:
a modular base having a channel portion disposed between two sidewalls;
a platform being disposed between the two sidewalls and coupled to the base by a pivot pin;
a surface attached to a base portion of the channel; and
a stop key configured to rotationally secure the platform in a locating position, wherein the stop key applies consistent pressure to the platform in the locating position of the platform, wherein the stop key engages the base and extends through a locking aperture in the platform, the stop key comprises negative flats configured to rotationally engage a pair of recessed steps disposed in the platform.

6. The pivoting fixture unit of claim 5, wherein the stop key comprises a spring washer disposed proximal to a shaft portion.

7. A pivoting fixture unit comprising:
a modular base having a channel portion disposed between two sidewalls;
a platform being disposed between the two sidewalls and coupled to the base by a pivot pin;
a surface attached to a base portion of the channel;
a stop key configured to rotationally secure the platform in a locating position, wherein the stop key applies consistent pressure to the platform in the locating position of the platform; and
a plurality of mounting holes being accessible with the platform in the locating position.

8. The pivoting fixture unit of claim 7, wherein the stop key engages the base and extends through a locking aperture in the platform.

9. A pivoting fixture unit comprising:
a modular base having a channel portion disposed between two sidewalls;
a platform being disposed between the two sidewalls and coupled to the base by a pivot pin;
a surface attached to a base portion of the channel;
a stop key configured to rotationally secure the platform in a locating position, wherein the stop key applies consistent pressure to the platform in the locating position of the platform; and
a spring disposed around the pivot pin and engaging the platform and the base to control rotation of the platform.

10. A locking mechanism comprising:
a platform being pivotally attached to a body;
a surface attached to the body and configured to abut the platform in a locating position; and
a stop key configured to rotationally secure the platform in the locating position, wherein the surface presses against the stop key to retain the platform in a locating position, wherein the stop key engages the body and extends through a locking aperture in the platform, the stop key comprises negative flats configured to rotationally engage a pair of recessed steps disposed in the platform.

11. The locking mechanism of claim 10, wherein the stop key engages a central portion of the platform.

12. The locking mechanism of claim 11, wherein the central portion of the platform is defined as at least ⅓ of the width of the platform.

13. The locking mechanism of claim 10, wherein the stop key comprises a tapered engaging surface being configured to engage the platform with increasing pressure along a rotational path until reaching a locked position.

14. The locking mechanism of claim 10, wherein the stop key is configured to lock and unlock through a single hand operation.

15. The locking mechanism of claim 10, wherein the stop key applies consistent pressure in the locating position independent of the rotational torque applied to rotate the stop key.

16. A locking mechanism comprising:
a platform being pivotally attached to a body;
a surface attached to the body and configured to abut the platform in a locating position; and
a stop key configured to rotationally secure the platform in the locating position, wherein the surface presses against the stop key to retain the platform in a locating position, wherein the stop key engages the body and extends through a locking aperture in the platform, the stop key comprises a spring washer disposed proximal to a shaft portion.

17. The locking mechanism of claim 16, wherein the stop key comprises negative flats configured to rotationally engage a pair of recessed steps disposed in the platform.

18. The locking mechanism of claim 16, wherein the locking aperture extends through the platform proximate to a longitudinal axis of the platform.

* * * * *